United States Patent [19]

Lindner et al.

[11] 4,360,620

[45] Nov. 23, 1982

[54] RUBBER DISPERSIONS

[75] Inventors: Christian Lindner, Cologne; Lothar Liebig; Karl-Heinz Ott, both of Leverkusen, all of Fed. Rep. of Germany

[73] Assignee: Bayer Aktiengesellschaft, Leverkusen, Fed. Rep. of Germany

[21] Appl. No.: 283,930

[22] Filed: Jul. 17, 1981

Related U.S. Application Data

[63] Continuation of Ser. No. 129,597, Mar. 12, 1980, abandoned.

[30] Foreign Application Priority Data

Mar. 15, 1979 [DE] Fed. Rep. of Germany ....... 2910154

[51] Int. Cl.$^3$ ............................ C08K 5/20; C08K 5/32
[52] U.S. Cl. .................................... 524/234; 524/233; 524/259; 524/205; 524/364; 524/389; 524/390
[58] Field of Search ................ 260/29.6 WQ, 29.7 E, 260/29.7 GP, 32.6 A, 32.8 A, 32.4, 33.4 R; 524/234, 205, 389, 390

[56] References Cited

U.S. PATENT DOCUMENTS 3,969,433 7/1976 Kose .
4,108,923 8/1978 Mast .

FOREIGN PATENT DOCUMENTS 1301068 12/1972 United Kingdom .

*Primary Examiner*—Paul R. Michl
*Attorney, Agent, or Firm*—Connolly and Hutz

[57] ABSTRACT

Stable, free-flowing dispersions in organic liquids of rubbers in the form of discrete particles having an average diameter of from 100 to 3,000 nm which contain: A—as rubber, from 1 to 20% by weight, based on the total dispersion, of a crosslinked diene rubber or a crosslinked, rubber-like acrylate polymer; B—from 0 to 15% by weight, based on the total dispersion, of water in the form of a water-in-oil emulsion; C—as the continuous organic phase, from 99 to 45% by weight, based on the total dispersion, of a mixture of from 95 to 60% by weight of a liquid aliphatic hydrocarbon having up to 20 carbon atoms; or $C_6$–$C_{12}$ aromatic hydrocarbon or a halogen derivative thereof and from 5 to 40% by weight of a $C_1$–$C_{12}$ alkanol, a ketone containing up to 8 carbon atoms, a formamide or a nitrile containing up to 6 carbon atoms, and a process for their manufacture.

1 Claim, No Drawings

RUBBER DISPERSIONS

CROSS REFERENCE TO RELATED APPLICATION

This application is a continuation of application Ser. No. 129,597 filed Mar. 12, 1980 and now abandoned.

This invention relates to stable, free-flowing dispersions of cross-linked, rubber-like polymers in organic liquids and to a process for the production thereof.

Aqueous dispersions (latices) of cross-linked and uncross-linked rubber polymers are known and are generally obtained by emulsion polymerisation. However, there are some applications which require stable dispersions of discrete microgel particles of rubber in organic liquids. Such stable organic rubber dispersions cannot be directly produced by the radical polymerisation of corresponding monomers in organic liquids because a continuous rubber network or macrogel, rather than discrete rubber particles, so-called microgel particles, is formed during polymerisation.

The present invention is based on the discovery that aqueous emulsions of cross-linked, rubber-like diene polymers or acrylate polymers can be dispersed in certain organic liquids so that the diene or acrylate polymers are distributed in the form of disperse swollen particles and the water of the original emulsion is also present in dispersion in the organic liquid (water-in-oil emulsion). If desired, the water can be removed by selectively breaking the water-in-oil emulsion and subsequently separating off the water mechanically, physically or chemically. For most applications of the organic rubber dispersions according to the present invention, there is no need for removing the water, provided it is present in stable dispersion and does not form a separate phase.

The present invention relates to stable, free-flowing dispersions in organic liquids of rubbers in the form of discrete particles having a mean diameter of from 100 to 3000 nm which contain:

(A) as rubber, from 1 to 20%, by weight, based on the total dispersion, of a cross-linked diene rubber or a cross-linked, rubber-like acrylate polymer;

(B) from 0 to 15%, by weight, based on the total dispersion, of water in the form of a water-in-oil emulsion;

(C) as the continuous organic phase, from 99 to 45%, by weight, based on the total dispersion, of a mixture of from 95 to 60%, by weight, of a liquid aliphatic hydrocarbon having up to 20 carbon atoms or a $C_6$-$C_{12}$ aromatic hydrocarbon or a halogen derivative thereof or from 5 to 40%, by weight, of a $C_1$-$C_{12}$ alkanol, a ketone containing up to 8 carbon atoms, a formamide or a nitrile containing up to 6 carbon atoms.

The present invention also relates to a process for the production of the stable, free-flowing rubber dispersion wherein an aqueous emulsion of a cross-linked diene rubber or acrylate polymer having an average rubber particle diameter of from 100 to 800 nm (as determined by light scattering) is dispersed with stirring in an organic liquid as the dispersion medium which comprises a mixture of from 95 to 60%, by weight, of a $C_1$-$C_{20}$ aliphatic or $C_6$-$C_{12}$ aromatic hydrocarbon or a halogen derivative thereof and from 5 to 40%, by weight, of $C_1$-$C_{12}$ alkanol, a ketone containing up to 8 carbon atoms, a formamide or a nitrile containing up to 6 carbon atoms, in the presence of from 0.005 to 4%, by weight, of a dispersant and wherein a coagulant for the latex is added with continued stirring in a quantity sufficient to break the aqueous latex.

The diene rubbers are in general highly cross-linked. They contain at least 50%, by weight, preferably more than 70%, by weight, of gel. The rubbers are generally present in the form of aqueous rubber dispersions obtained by emulsion polymerisation, i.e. in the form of latices. They preferably contain as rubbers homopolymers of conjugated dienes containing from 4 to 8 carbon atoms, such as butadiene, isoprene and chloroprene, butadiene being particularly preferred, or copolymers thereof with up to 40%, by weight, preferably up to 10%, by weight, of a vinyl compound, such as acrylonitrile, methacrylonitrile, styrene, α-methyl styrene, halogen styrenes, $C_1$-$C_4$ nuclear alkyl styrenes, $C_1$-$C_6$ alkyl acrylates and methacrylates, acrylic acid, methacrylic acid, vinyl sulphonic acid, allyl sulphonic acid, alkylene glycol diacrylates and methacrylates and divinyl benzene.

The rubber-like homo- or co-polymers of $C_1$-$C_{10}$ alkyl acrylates are generally cross-linked. They, generally, contain at least 50%, by weight, preferably more than 70% by weight, of gel. The rubbers are generally present in the form of aqueous rubber dispersions obtained by emulsion polymerisation, i.e. in the form of latices. They contain as rubbers homopolymers of $C_1$-$C_{10}$ alkyl acrylates, for example homopolymers of methyl acrylate, ethyl acrylate and n-butyl acrylate, or copolymers containing up to 40%, by weight, preferably no more than 10%, by weight, of monovinyl compounds, such as acrylonitrile, methacrylonitrile, vinyl butyl ether, vinyl methyl ether, styrene, α-methyl styrene chlorostyrene, p-t-butyl styrene, (nuclear) methyl styrene, acrylic acid, methacrylic acid, methyl, ethyl, propyl, n-butyl and t-butyl acrylates and methacrylates or vinyl sulphonic acid. They can also contain up to 8%, by weight, preferably up to 4%, by weight, of divinyl or polyvinyl compounds or polyallyl compounds and/or N-methylol acrylamide (or methacrylamide) derivatives which then act as cross-linkers. Examples include: divinyl benzene, ethylene glycol, propylene glycol or polyalkylene oxide glycol acrylic or methacrylic acid ester, triallyl cyanurate, methacrylic acid vinyl ester, N-methylol acrylamides or methacrylamides, butadiene and isoprene. Preferred acrylate rubbers are cross-linked poly-n-butyl acrylates which contain as cross-linking monomer up to 5%, by weight, of 1,2-butane diol diacrylate and/or butadiene and/or N-methoxy methyl acrylamide and/or triallyl cyanurate.

The dispersion medium mixtures used are mixtures of from 95 to 60%, by weight, of a saturated aliphatic and/or aromatic hydrocarbon and/or halogen derivatives thereof from the series of liquid paraffins having up to 20 carbon atoms, $C_6$-$C_{12}$ aromatic hydrocarbons, such as benzene, toluene, xylene, halogen styrene, chlorobenzene, anisole and nitrobenzene, preferably styrene, pentane, hexane, heptane, cyclo-hexane, technical petroleum ether mixtures, chloromethane, methylene chloride or chloroform, and from 5 to 40%, by weight, of a saturated $C_1$-$C_{12}$ alkanol, such as methanol, ethanol, butanol, hexanol, t-butanol, cyclohexanol, diethylene glycol, ethylene glycol, propylene glycol or glycerol, a saturated aliphatic ketone containing up to 8 carbon atoms in the molecule, such as acetone, diethyl ketone, methyl ethyl ketone, cyclohexanone and/or a saturated, aliphatic nitrile, such as acetonitrile or propionitrile, or a formamide, such as dimethyl formamide.

Preferred dispersion mixtures are mixtures of from 90 to 83%, by weight, of styrene and from 10 to 27%, by weight, of $C_1$–$C_{15}$ alkanols; from 90 to 67%, by weight, of styrene and from 10 to 33%, by weight, of acetone or methyl ethyl ketone; from 80 to 72%, by weight, of styrene and from 20 to 28%, by weight, of dimethyl formamide; or from 87 to 83%, by weight, of styrene and from 13 to 17%, by weight, of acetonitrile.

To carry out the process for producing the dispersions, a latex of a diene or acrylate polymer is suspended in one of the above-mentioned dispersion media. To this end, from 0.005 to 4%, by weight, of a dispersant is added to the dispersion medium. In general, any of the known conventional dispersants can be used, although it is particularly preferred to use acrylic acid esters or methacrylic acid esters, long-chain monoalcohols, partial reaction products of maleic acid/α-olefin copolymers and long-chain alkanols, long-chain aliphatic carboxylic acids, resinic acids, high molecular weight alcohols, esters, ethers and/or polyolefins, for example, organic solvent soluble polybutadienes. ("long chain" means preferably 8 to 24 C-atoms). Suspension of the latices in the organic liquids requires vigorous stirring. In general, from 3 to 50 parts, by weight, of latex may be suspended in 100 parts, by weight, of organic liquid. Since the latices generally contain from 30 to 60%, by weight, of solids, this means a rubber content of from 1 to 20%, by weight, in the organic dispersion.

A coagulant is then added with stirring to the rubber emulsion suspension in the organic liquid in a quantity which is sufficient to break the aqueous emulsion of the rubber. The coagulant is normally used in a quantity of from 2 to 20%, by weight, based on the solids content of the aqueous emulsion to be dispersed. The dispersion according to the present invention which, in addition to the dispersed rubber, contains water in the form of a water-in-oil emulsion is, generally, formed either immediately or at the latest after 1 hour at a temperature of from 0° to 100° C., preferably from 20° to 50° C.

If desired, this water may be removed either by selectively breaking the water-in-oil emulsion (e.g., by adding electrolytes, such as acids or bases) and separating off the water as a separate phase, or by azetropically distilling off the water immediately without coagulation. The water-containing rubber dispersions according to the present invention have a more or less milky appearance, whilst the water-free rubber dispersions are opaque. The instrinsic viscosity thereof may be influenced by acids or bases.

The organic dispersions are largely unaffected by electrolytes, such as salts, acids or bases. They can be precipitated using large quantities of certain solvents, e.g., aliphatic alcohols, ketones (for example acetone), acetonitrile or dimethyl formamide.

The dispersions according to the present invention may be polymerised, for example by means of radical initiators or redox initiators, and hardened at room temperatures of from 0° to 150° C. Where the dispersions additionally contain e.g. reinforcing fillers or pigments they may be used for the production of impact-resistant coatings or, for example, as cast resins having specialised properties, such as high resistance to ageing.

EXAMPLES

Production of the aqueous rubber emulsions:

The production of rubber-like (co)polymer latices by emulsion polymerisation is known.

The following emulsions are used for the dispersion test (Table 1):

TABLE 1

| Example No. | Type of rubber (or composition) in %, by weight | Rubber content() of the latex (%, by weight) / gel content (%, by weight) (*) | Latex particle size(*) (nm) | pH |
|---|---|---|---|---|
| 1 | polybutadiene (BR) | 57/88 | 490 | alkaline |
| 2 | polybutadiene (BR) | 60/91 | 160 | alkaline |
| 3 | polybutadiene (BR) | 50/87 | 830 | alkaline |
| 4 | acrylonitrile/butadiene (NBR) | 49/80 | 350 | neutral |
| 5 | butadiene/styrene (SBR) | 50/74 | 300 | alkaline |
| 6 | 95% n-butyl acrylate 5% N—methoxymethyl methacrylamide | 40/85 | 120 | acid |
| 7 | 90% n-butyl acrylate 9% butadiene 1% vinyl butyl ether | 39/79 | 150 | alkaline |

(*)as measured by light scattering; cf. "Polymerannalytik", M. Hoffmann et al, Georg Thieme Verlag, Stuttgart (1977);
(**)based on the total weight of the emulsion;
(***)based on 100 parts, by weight, of the rubber present in emulsion.

Production of the rubber dispersions according to the present invention:

General Procedure:

800 parts, by weight, of an organic medium are stirred with X parts, by weight, of a dispersant. 200 parts, by weight, of the aqueous rubber emulsions (Examples 1 to 7) are then added with stirring. Y parts, by weight, of a coagulant are then added to the suspension, followed by stirring for Z minutes at room temperature, resulting in formation of the rubber dispersions in organic media (Table 2).

TABLE 2

| Example No. | Rubber emulsion | Type of organic medium() (%, by weight) | Type of coagulant in Y parts, by weight | Type of dispersant in X parts, by weight(*) | Stirring time in Z mins. | Rubber particle size(*) in the organic medium (nm) |
|---|---|---|---|---|---|---|
| 6 | 1 | 86% styrene 14% isopropanol | 1 acetic acid | 0.2 dispersant A | 10 | 790 |
| 7 | 2 | 14% isopropanol | " | " | 10 | 220 |
| 8 | 3 | 14% isopropanol | " | " | 10 | 1400 |
| 9 | 4 | 14% isopropanol | " | " | 10 | 600 |
| 10 | 5 | 14% isopropanol | " | " | 10 | 500 |
| 11 | 1 | 80% styrene 20% acetone | " | 0.3 dispersant B | 10 | 700 |
| 12 | 1 | 75% styrene 25% dimethyl foramide | " | 0.3 dispersant C | 10 | 700 |
| 13 | 1 | 85% styrene 15% acetonitrile | " | 0.2 dispersant A | 30 | 690 |
| 14 | 1 | 80% styrene 20% cyclohexanone | 2MgSO$_4$ | " | 30 | 660 |
| 15 | 1 | 78% styrene 22% diethyl ketone | 1 acetic acid | " | 20 | 700 |
| 16 | 1 | 80% n-hexane 20% acetonitrile | 2MgSO$_4$ | 0.1 dispersant A | 30 | 700 |
| 17 | 1 | 100% acetic acid n-butyl | 2 acetic acid | 4.0 dispersant A | 10 | 800 |
| 18 | 6 | 85% styrene 14% isopropanol | 2MgSO$_4$ | 4.0 dispersant A | 10 | 230 |
| 19 | 7 | 85% styrene 14% isopropanol | " | " | 10 | 290 |
| 20 | 1 | 87.5% methylene chloride 12.5% acetone | 1 acetic acid | 0.3 dispersant B | 10 | 785 |

(*)as determined by light scattering or by optical microscope
(**)percentages based on 800 parts, by weight, in the general procedure
(***)for an explanation of the dispersants, see Table 3

TABLE 3

Dispersants used in Table 2:

| Type | |
|---|---|
| A = | reaction products of maleic acid anhydride-1-olefin copolymers with higher alkanols (cf. G Sackmann et al "Angew. Makromol. Chemie" 69 (1978), No. 1041, pages 141–156) |
| B = | polydecyl methacrylate |
| C = | disproportionated abietic acid |

We claim:

1. A stable, free-flowing dispersion in organic liquid of a rubber in the form of discrete particles having an average diameter of from 100 to 3,000 nm, said dispersion containing (A) from 1 to 20% by weight, based on the total dispersion, of a cross-linked diene rubber or a cross-linked, rubber-like acrylate polymer;
(B) from 0 to 15% by weight, based on the total dispersion, of water in the form of a water-in-oil emulsion and
(C) from 99 to 45% by weight, based on the total dispersion, of a mixture of from 95 to 60% by weight of a member selected from the group consisting of liquid paraffins having up to 20 carbon atoms, halogenated derivatives thereof, benzene, toluene, xylene, chlorobenzene, anisole and nitrobenzene and from 5 to 40% by weight of $C_1$–$C_{12}$ alkylanol, a ketone containing up to 8 carbon atoms, a formamide or a saturated aliphatic nitrile containing up to 6 carbon atoms.

* * * * *